United States Patent [19]
Burke et al.

[11] Patent Number: 5,641,333
[45] Date of Patent: Jun. 24, 1997

[54] INCREASING THE RETENTION OF GEO$_2$ DURING PRODUCTION OF GLASS ARTICLES

[75] Inventors: Gerald E. Burke, Painted Post; Carlton M. Truesdale, Corning, both of N.Y.

[73] Assignee: Corning Incorporated, Corning, N.Y.

[21] Appl. No.: 566,354

[22] Filed: Dec. 1, 1995

[51] Int. Cl.⁶ .................................................. C03B 19/01
[52] U.S. Cl. ........................... 65/17.4; 65/17.3; 65/17.5; 65/17.6
[58] Field of Search ........................... 65/17.3, 17.4, 65/17.5, 17.6, 30.1, 423, 426

[56] References Cited

U.S. PATENT DOCUMENTS

| | | | |
|---|---|---|---|
| 3,868,170 | 2/1975 | DeLuca | 350/96 |
| 3,933,454 | 1/1976 | DeLuca | 65/426 X |
| 4,125,388 | 11/1978 | Powers | 65/426 |
| 4,165,223 | 8/1979 | Powers | 65/426 X |
| 4,263,031 | 4/1981 | Schultz | 65/426 X |
| 4,664,690 | 5/1987 | Kyoto et al. | 65/426 |
| 4,675,038 | 6/1987 | Ainslie et al. | 65/426 |
| 4,822,399 | 4/1989 | Kanamori et al. | 65/426 X |

*Primary Examiner*—Donald E. Czaja
*Assistant Examiner*—Sean Vincent
*Attorney, Agent, or Firm*—William J. Simmons, Jr.

[57] ABSTRACT

A method for forming a GeO$_2$-doped SiO$_2$ glass article by depositing glass particles to form a porous preform and then drying and sintering the porous preform. A precursor of SnO$_2$ is also present in the reactant stream used to form the particles, whereby the reaction produces particles of glass that contain GeO$_2$, SiO$_2$ and SnO$_2$. The presence of SnO$_2$ in the particles reduces the reaction of GeO$_2$ with chlorine to form GeCl$_4$ during the drying step. The GeCl$_4$ that would have formed would have either escaped from the porous preform or caused GeO$_2$ to be re-deposited in an undesirable portion of the preform. The retention of GeO$_2$ in the article is therefore enhanced.

16 Claims, 3 Drawing Sheets

INCREASING THE RETENTION OF GEO$_2$ DURING PRODUCTION OF GLASS ARTICLES

BACKGROUND OF THE INVENTION

This invention relates to an improved method for making GeO$_2$-doped glass articles. A specific application of the invention is the production of optical waveguide fibers and, in particular, preforms from which such fibers can be produced.

Optical waveguide fibers consist of a core surrounded by cladding material having a refractive index lower that that of the core. Depending on the type of fiber and its desired performance characteristics, the radial distribution of the refractive index across the face of the fiber can be simple or complex. For example, single-mode fibers typically have a refractive index profile which is a simple step, i.e., a substantially uniform refractive index within the core and a sharp decrease in refractive index at the core-cladding interface. On the other hand, to produce a high bandwidth, multimode fiber requires achieving a nearly parabolic radial refractive index profile in the fiber core so as to minimize intermodal dispersion.

Optical fibers can be prepared by various known techniques. The present invention is concerned with those techniques such as the outside vapor deposition (OVD) technique and the axial vapor deposition (AVD) technique wherein a porous glass preform is formed and then consolidated.

Preforms produced by vapor deposition techniques typically are composed of silicon dioxide (SiO$_2$) selectively doped with at least one metal or metalloid oxide to provide the desired refractive index profile. The preferred dopant in commerical use today is germanium dioxide (GeO$_2$). In processes for manufacturing optical fibers, precursors for the deposition of metal oxide dopants are relatively expensive raw ingredients. It is therefore important that the dopant be effectively incorporated in the preform with a minimum of dopant loss during processing.

In accordance with the OVD technique, which will be discussed during a description of the invention, glass particles can be formed by oxidizing and/or hydrolyzing the halide materials SiCl$_4$ and GeCl$_4$ in a burner. The preform is formed from the glass particles by moving the burner back and forth along the length of a rotating mandrel. See U.S. Pat. No. 4,486,212, for example. The distance between the mandrel and the burner is selected so that the glass particles collect on the mandrel in thin layers with each pass of the burner. The amount of halide materials supplied to the burner is adjusted during the glass laydown process so as to produce a dopant concentration in the preform which varies with radius. This dopant concentration profile is selected so that the finished fiber will have the desired refractive index profile.

The mandrel is removed from the porous preform, thereby forming an aperture. The porous preform is then placed in a consolidation furnace where it is dried and sintered. During the drying step or during the entire consolidation process, depending upon the particular consolidation process employed, a first drying gas mixture, which usually contains helium and a drying agent such as chlorine or fluorine, flows into the aperture. A drying agent can also be flowed through the furnace (see, for example, U.S. Pat. No. 4,165,223). The drying step reduces the residual OH content of the preform, thereby reducing in the resultant optical fiber the absorption loss caused by OH groups in the vicinity of the 1300 nm operating wavelength. The step of sintering a porous preform produces a dense, substantially clear glass article which itself can be drawn into the optical fiber or which can be provided with additional cladding and then drawn into an optical fiber. The entire porous preform can be dried before the sinter step begins; alternatively, the preform can be subjected to a gradient consolidation process whereby the temperature of each individual element of the preform increases and decreases with the approach and passing of the hot zone, respectively. As the hot zone approaches, the preform element becomes sufficiently hot that the drying gas mixture can react with the OH ions in the glass, but the preform temperature is not so high that preform porosity is decreased to the point that drying gas flow is impeded. As the preform element is subjected to the maximum temperature region of the hot zone, the pore size decreases and the preform element then completely sinters and clarifies.

During the consolidation process, dopant from the core portion of a porous preform can migrate through the pores to the cladding portion, thereby creating a dopant depleted region at the edge of the core and a corresponding dopant rich region in the adjacent cladding; this combination is known as a "diffusion tail". Moreover, in a multimode fiber wherein a central region of the core has a higher dopant concentration than an adjacent region of greater radius, dopant can migrate from the region of higher concentration to the region of lesser concentration to alter the core refractive index profile.

Two features of the refractive index profile, the central dip and the diffusion tail, have been recognized as limiting the optical performance of optical fibers. The central dip has been shown to be correlated with decreasing the optical bandwidth of the fiber. Modelling has revealed that the diffusion tail has the effect of increasing the optical attenuation of the fiber. Moreover, the migration of germanium out of the preform is very costly, especially in a process for fabricating multimode optical fibers. A multimode fiber fabrication process requires a large amount of germanium source material in order to produce cores having greater radii and greater refractive indices as compared to single-mode fibers. Therefore, processes which could retain more germania in the sample could result in the production of more product (increased select), a better performance distribution, and a capital avoidance of buying germanium-containing source materials.

SUMMARY OF THE INVENTION

It is therefore an object of the present invention to improve the process for producing porous GeO$_2$-doped glass preforms. More particularly, the objects of the invention include: 1) reducing the amount of germanium containing precursors used in the formation of consolidated draw blanks from which optical fibers are drawn and 2) improving the refractive index profiles of germanium containing optical fiber draw blanks.

Briefly, the present invention relates to a process for forming a GeO$_2$-doped SiO$_2$-based glass article. A reactant stream which includes precursors of SiO$_2$ and GeO$_2$ is flowed to a reaction zone. The precursors are reacted to form a stream of glass particles, and the particles are collected to form a porous preform. The porous preform is dried and sintered to form a clear glass article. In accordance with the invention, the reactant stream includes a precursor of an oxide of a metal M which in its oxide state is not a glass former with SiO$_2$ and which decomposes to provide oxygen to reduce the reaction of GeO$_2$ with chlorine to thereby enhance the retention of GeO$_2$ in the article during the step of drying.

DESCRIPTION OF THE PREFERRED EMBODIMENTS

Figure 1:
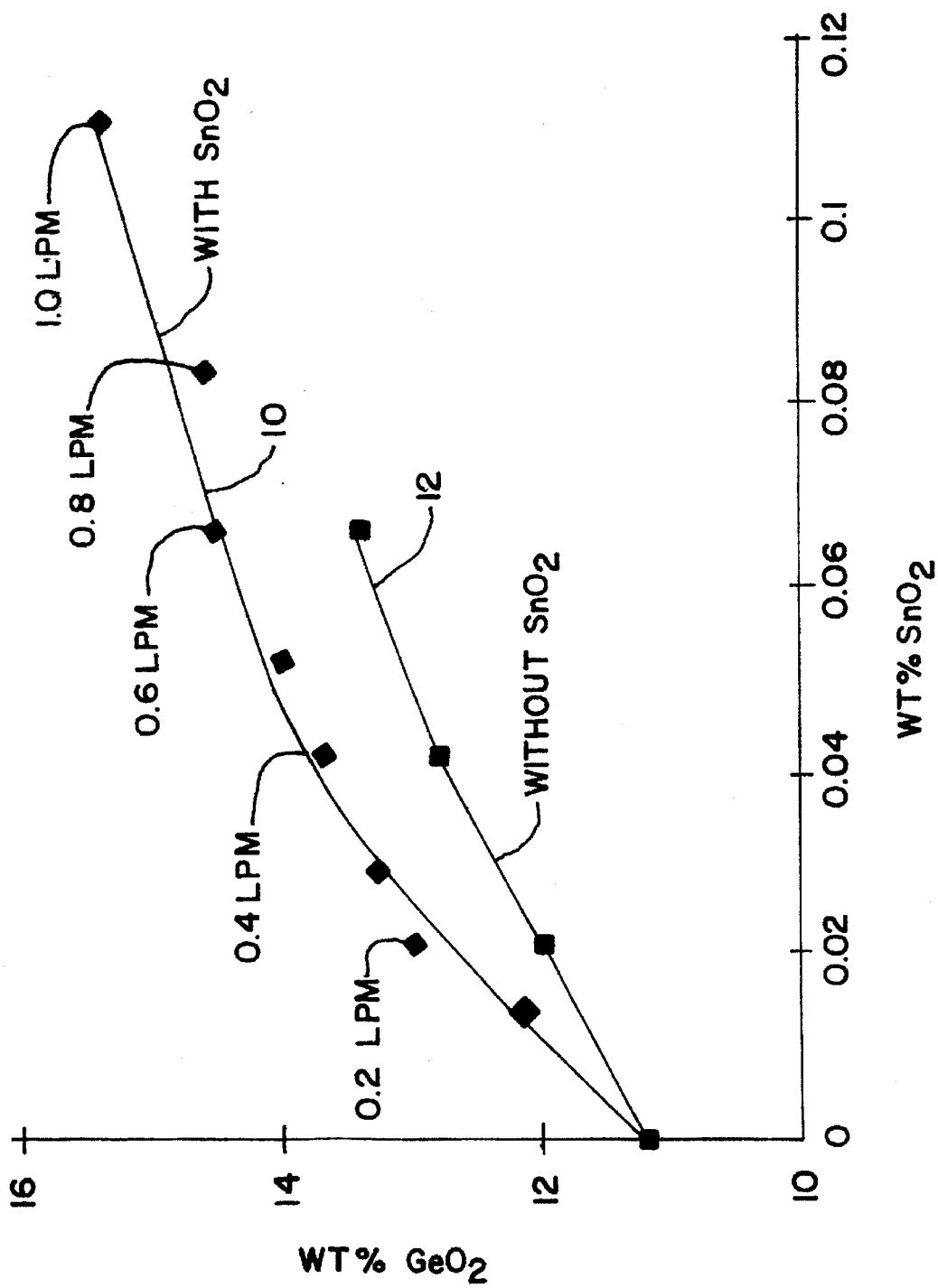
FIG. 1 is a graph showing $GeO_2$ concentration in unconsolidated soot preforms as a function of the concentration of $SnO_2$ in the soot particles.

To achieve the above-mentioned and other objects, the invention provides a stabilized optical fiber preform fabrication process in which 1) the efficiency of $GeO_2$ incorporation into the porous preform produced by the laydown step is slightly increased and 2) the tendency of the $GeO_2$ to move within the preform and either redeposit in an undesirable location or leave the preform is reduced. Since this technique is especially applicable to a method for forming draw blanks from which optical fibers are drawn, that method will be specifically described herein. The improvement in efficiency of retention of $GeO_2$ in a silica-based glass article is accomplished by initially co-doping the deposited $GeO_2$—$SiO_2$ porous glass with an oxide of a metal M selected from the group consisting of tin, antimony and bismuth. For example, tin in the form of $SnCl_4$ can be mixed with chlorides of germania and silica in the reactant gas mixture that is fed to the burner to produce $SnO_2$-doped germania silicate porous preforms. The addition of $SnO_2$ to $GeO_2$-containing $SiO_2$ glass particles in an OVD soot deposition technique has resulted in the retention of up to 37% more $GeO_2$ in the consolidated core preform or core cane as compared to a similar process wherein no $SnO_2$ is deposited. By "core cane" is meant a preliminary glass article that includes the core portion of the resultant optical fiber and optionally includes some of the cladding portion. The core cane is then overclad with cladding glass particles and consolidated to form a draw blank from which the optical fiber is drawn. It is noted that other source materials such as organometallics can also be used to deposit these oxides. The improvement in the retention of $GeO_2$ in a silica-based glass article is accomplished without adversely affecting the refractive index profile of the resultant preform. Although the formation of germania silicate glass articles is specifically discussed herein, the present invention is also applicable to the formation of germania silicate glasses that also contain one or more dopants such as $P_2O_5$, $B_2O_3$ and the like.

There is only a small increase in germania laydown efficiency when tin oxide is employed as a co-dopant in the deposition of germania-silicate soot (glass particles) on a bait rod to form a porous preform. Unconsolidated germania silicate porous preforms were prepared with and without tin to compare the germania concentration. The deposition system employed a burner of the type shown in FIG. 3 of U.S. Pat. No. 4,165,223, which is incorporated herein by reference. The burner included a face having a centrally located fume orifice surrounded by concentric rings of orifices. The rings of orifices, which are referred to in Tables 1 and 2, are the inner shield orifices IS, the premix orifices, and the outer shield orifices OS, named in order of increasing radius. The reactant compounds emanate from the fume orifice where they are subjected to heat from a flame produced by the fuel gas and oxygen emanating from the premix orifices. Streams of oxygen flow from orifices IS and OS. These soot samples were made using a bubbler delivery system of the type disclosed in U.S. Pat. No. 3,826,560. The heated bubblers contained $SiCl_4$, $GeCl_4$, and $SnCl_4$ maintained at the temperatures indicated in Tables 1 and 2. The tables summarize the temperature and flow conditions used; all flows are in liters per minute (lpm). The flows through the reactants (first three columns) indicate the oxygen flows through the bubblers containing those reactants. In each case a soot preform was built up for 30 minutes on an alumina bait rod and removed for analysis.

TABLE 1

| $SiCl_4$ @43$_B$C | $GeCl_4$ @43$_B$C | $SnCl_4$ @55$_B$C | Premix $CH_4$ | Premix $O_2$ | IS $O_2$ | OS $O_2$ | Fume $O_2$ |
|---|---|---|---|---|---|---|---|
| 2.0 | 0.5 | 0.1 | 6.0 | 5.82 | 2.0 | 3.6 | 1.0 |
| 2.0 | 0.5 | 0.2 | 6.0 | 5.82 | 2.0 | 3.6 | 1.0 |
| 2.0 | 0.5 | 0.3 | 6.0 | 5.82 | 2.0 | 3.6 | 1.0 |
| 2.0 | 0.5 | 0.4 | 6.0 | 5.82 | 2.0 | 3.6 | 1.0 |
| 2.0 | 0.5 | 0.5 | 6.0 | 5.82 | 2.0 | 3.6 | 1.0 |
| 2.0 | 0.5 | 0.6 | 6.0 | 5.82 | 2.0 | 3.6 | 1.0 |
| 2.0 | 0.5 | 0.8 | 6.0 | 5.82 | 2.0 | 3.6 | 1.0 |
| 2.0 | 0.5 | 1.0 | 6.0 | 5.82 | 2.0 | 3.6 | 1.0 |

Curve 10 of FIG. 1 is a graph showing $GeO_2$ concentration in unconsolidated soot preforms as a function of the concentration of $SnO_2$ in the soot particles. The diamond-shaped data points on curve 10 show the effect of the addition of $SnCl_4$ at the different concentrations indicated in Table 1 to fixed flow rates of germania and silica. The flow rates of oxygen through the $SnCl_4$-containing bubbler are given for most of the data points on curve 10.

The second set of data (represented on the plot of FIG. 1 by the square data points) shows four samples made under the same flow conditions described above except that $SnCl_4$ is not added to the reactant gas mixture. As shown in the column labeled "Fume $O_2$" of Table 2, the oxygen which would have normally flowed through the tin tetrachloride bubbler is added to the fume stream to be certain that that oxygen which had delivered the tin was not responsible for the increase in $GeO_2$ retention. Even though the extra oxygen in the fume stream slightly increases the $GeO_2$ content of the unconsolidated soot preform, it is not responsible for the large $GeO_2$ increase that has been observed in the consolidated glass article.

TABLE 2

| $SiCl_4$ @43$_B$C | $GeCl_4$ @43$_B$C | $SnCl_4$ @55$_B$C | Premix $CH_4$ | Premix $O_2$ | IS $O_2$ | OS $O_2$ | Fume $O_2$ |
|---|---|---|---|---|---|---|---|
| 2.0 | 0.5 | 0.0 | 6.0 | 5.82 | 2.0 | 3.6 | 1.0 |
| 2.0 | 0.5 | 0.0 | 6.0 | 5.82 | 2.0 | 3.6 | 1.2 |
| 2.0 | 0.5 | 0.0 | 6.0 | 5.82 | 2.0 | 3.6 | 1.4 |
| 2.0 | 0.5 | 0.0 | 6.0 | 5.82 | 2.0 | 3.6 | 1.6 |

These experiments show that there is only about a 10% increase in germania concentration in the unconsolidated porous preform due to the presence of $SnO_2$. Such a small increase in germania concentration at this point in the process cannot account for the enhancements in germania concentration of up to 37% that have been observed after the porous preforms are dried and sintered.

The main beneficial effect of the tin occurs in the consolidation furnace where the system kinetics and thermodynamics support an enhancement in germania retention. Stannous dioxide exists in two phases, mostly crystalline $SnO_2$ (cassiterite) with some amorphous $SnO_2$ in the $SiO_2/GeO_2$ matrix. The crystalline $SnO_2$ reacts with chlorine faster than that tied up in the matrix to produce $O_2$ in accordance with equation (1).

$$SnO_2 + 2Cl_2 \rightarrow SnCl_4 + O_2 \qquad (1)$$

Due to the high reactivity of the $SnO_2$ crystals with chlorine, very little $SnO_2$ remains in the glass. Some quantity of $SnO_2$ decomposes into $SnO$ and provides additional $O_2$ in accordance with equation (2).

$$2SnO_2 \rightarrow 2SnO + O_2 \qquad (2)$$

The additional $O_2$ from the above reactions causes $GeO_2$ to be retained instead of producing volatile $GeCl_4$. One likely mechanism is that oxygen from reactions (1) and (2) shifts the reaction of $GeO_2$ with chlorine to the left as shown in reaction (3) to form $GeO_2$.

$$GeO_2 + 2Cl_2 \rightharpoonup GeCl_4 + O_2 \qquad (3)$$

Chlorine will react at a fast rate with species that are not bound to the glass matrix. If the additional oxygen was not available to cause $GeO_2$ to be retained, $GeCl_4$ would either leave the glass as a gas species, or react with oxygen to re-deposit $GeO_2$ in another portion of the porous preform such as the cladding.

Bismuth and antimony are expected to have an effect similar to that of tin. The oxides of these elements are not expected to form an amorphous network with silica or germania. These oxides easily give up oxygen as they are heated to 900 C. As can be observed in Table 3, it would be expected that the oxygen provided from the decomposition of oxides of bismuth and antimony would also help to retain germania. The bismuth and antimony should be easily removed by the chlorine drying step.

TABLE 3

| Oxide | Melting Point ($_EC$) | Boiling Point ($_EC$) |
| --- | --- | --- |
| $Sb_2O_5$ | −0 380 | $Sb_2O_3$ 1.550 sublimes |
|  | −20 930 |  |
|  | $Sb_2O_3$ 656 |  |
| $Bi_2O_5$ | −0 150 | $Bi_2O_3$ 1890 |
|  | −20 357 |  |
|  | $Bi_2O_3$ 825–860 |  |

Microprobe analyses of optical fiber "core canes" (described below) demonstrate that consolidated glass that is formed by a process that employs $SnCl_4$ in the soot laydown step has a much larger concentration of germania than consolidated glass that is formed by a process that does not employ $SnCl_4$ in that step. Single-mode fibers are often made by forming a soot core preform that includes the layers of glass soot that are required to form the fiber core and a few layers of cladding soot (see U.S. Pat. No. 4,486,212). The soot core preform is consolidated to form a core cane that is thereafter overclad with cladding soot to form a preform that is consolidated and drawn into an optical fiber. The germania retention enhancement feature of the present invention can be shown by analyzing the consolidated core cane.

Core canes were made by a process similar to the process described above in connection with Tables 1 and 2 for forming soot preforms. The rates of oxygen flow through the bubblers containing $SiCl_4$, $GeCl_4$ and $SnCl_4$ and the inner shield oxygen, outer shield oxygen and fume oxygen are given in Table 4.

TABLE 4

| Porous Preform | $SiCl_4$ @$43_EC$ | $GeCl_4$ @$43_EC$ | $SnCl_4$ @$55_EC$ | IS $O_2$ | OS $O_2$ | Fume $O_2$ |
| --- | --- | --- | --- | --- | --- | --- |
| #8055-18 | 1.4 | 0.8 | 0.0 | 2.0 | 3.6 | 1.0 |
| #8055-19 | 1.4 | 0.8 | 1.0 | 2.0 | 3.6 | 1.0 |

Premix $CH_4$ was linearly ramped from 8.5 lpm to 15 lpm and the premix $O_2$ was linearly ramped from 8.24 lpm to 14.55 lpm during the formation of both preforms. The concentration of $SnCl_4$ in the reactant gas mixture used to produce porous preform #8055-19 was 13 vol. %, whereas no $SnCl_4$ was used to make porous preform #8055-18. The porous preforms were consolidated to form core canes, the identifying numbers of which are the same as those of the corresponding preforms. The porous preforms were consolidated under identical conditions. The mandrel was removed from the preform to form a tubular porous preform having a longitudinal aperture. The preform was lowered into a $1510_EC$ hot zone of a consolidation furnace at a rate of 6 mm/minute. Helium flowed upwardly through the furnace muffle at a rate of 40 lpm. A drying gas mixture of 0.66 lpm helium and 0.042 lpm chlorine flowed into the longitudinal aperture.

Figure 2:
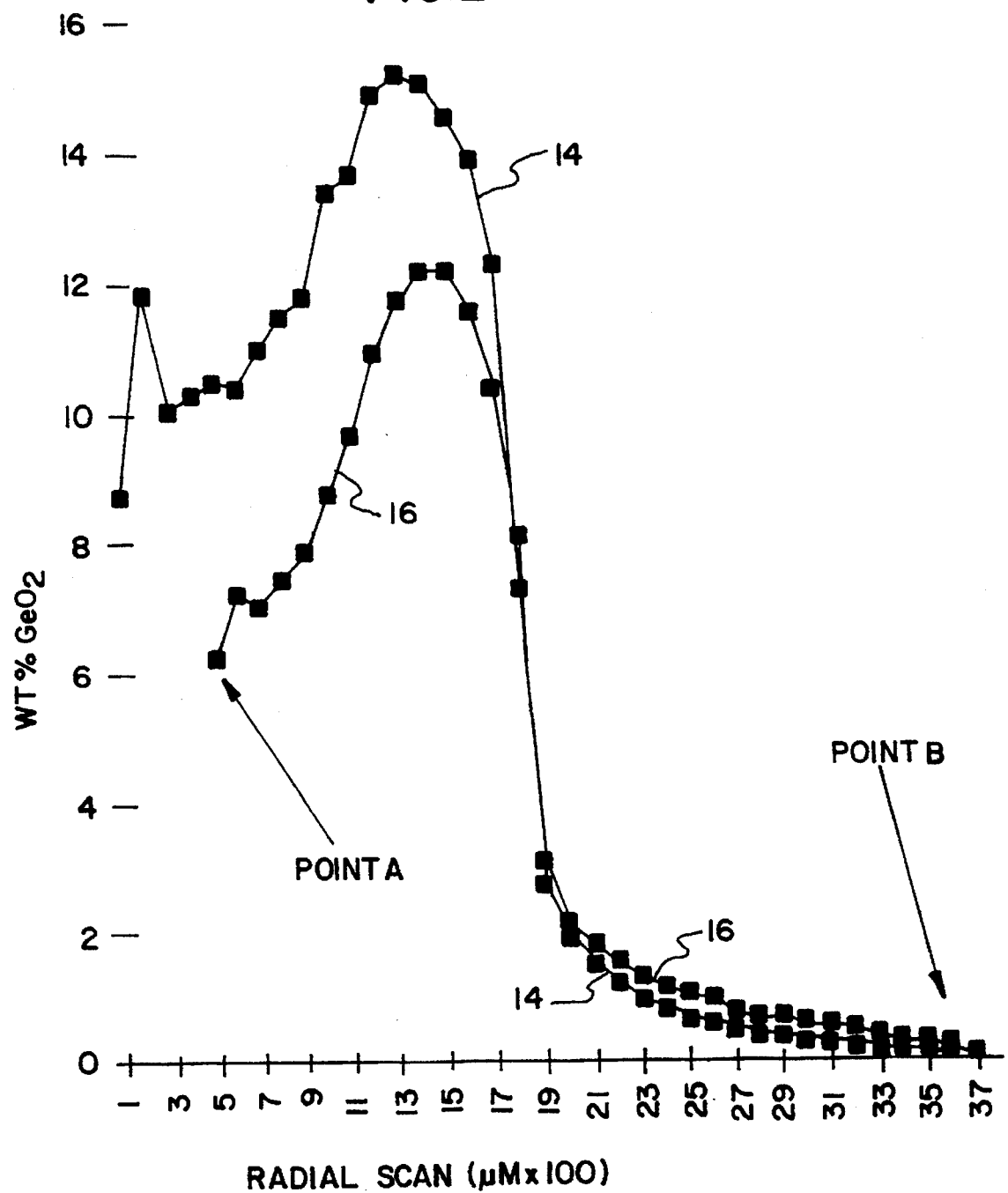
FIG. 2 is a graph showing microprobe analyses of consolidated core canes made by processes employing the same amounts of $GeCl_4$ in the reactant gas mixture, one of the processes also employing $SnCl_4$ in the glass particle deposition process.

FIG. 2 shows microprobe analyses for the resultant consolidated core canes. Curve 14 represents the microprobe analysis for core cane 8055-19, and curve 16 represents the microprobe analysis for core cane 8055-18. The total amount of germania in core cane 8055-19 is about 37% greater than that in core cane 8055-18. The total amount of germania in each of core canes 8055-19 and 8055-18 was determined by fitting curves 14 and 16 between points A and B to high order polynomials (12–14th order) and integrating over the radial coordinate. It is noted that the shapes of curves 14 and 16 are substantially independent of whether tin is present during the soot laydown process. These results demonstrate that the concentration of germania could be increased without sacrificing the control of the desired refractive index profile. A tin precursor reactant can therefore be used without radically altering the manufacturing recipe.

Microprobe analysis has not detected tin in the final glass samples (below detection limit of 0.01 wt. %). Apparently, tin performs its function of enhancing the retention of germania in the consolidated preform and then for all practical purposes vacates the preform.

To ascertain whether the mechanical and optical properties of optical fibers are adversely affected by adding $SnCl_4$ to the reactant gas mixture, optical fibers were made by a process similar to the that described above in connection with Tables 1 and 2 for forming soot preforms. Bubblers containing $SiCl_4$ and $GeCl_4$ were held at $43_EC$, and a bubbler containing $SnCl_4$ was held at $55_EC$. Initial flow rates to the burner were: 2.0 lpm oxygen through the bubbler containing $SiCl_4$, 0.5 lpm oxygen through the bubbler containing $GeCl_4$, 0.4 lpm oxygen through the bubbler containing $SnCl_4$, 6 lpm Premix $CH_4$, 5.82 lpm Premix $O_2$, 2.0 lpm IS oxygen, 3.6 lpm OS oxygen and 1.0 lpm fume oxygen. The flow rates of $SiCl_4$, IS oxygen, OS oxygen and fume oxygen remained constant during the entire run, the duration of which was 14,040 seconds. The flow rate of $SnCl_4$ remained constant at 0.4 lpm during the first 5400 seconds of the run, during which the core portion of the preform was deposited. The flow rates of $CH_4$ and Premix $O_2$ are listed in Table 5 as well as the flow rate of oxygen through the bubbler containing $GeCl_4$.

TABLE 5

| Time (sec) | GeCl$_4$ @43$_E$C | Premix CH$_4$ | Premix O$_2$ |
| --- | --- | --- | --- |
| 0 | 0.5 | 6.0 | 5.82 |
| 675 | 0.475 | 6.0 | 5.82 |
| 676 | 0.475 | 6.0 | 5.82 |
| 1350 | 0.475 | 6.0 | 5.82 |
| 1351 | 0.475 | 6.0 | 5.82 |
| 3375 | 0.35 | 6.0 | 5.82 |
| 3376 | 0.35 | 6.0 | 5.82 |
| 4725 | 0.4 | 6.0 | 5.82 |
| 4726 | 0.4 | 6.0 | 5.82 |
| 5400 | 0.4 | 6.0 | 5.82 |
| 5401 | | 6.0 | 5.82 |
| 14040 | | 14.0 | 13.58 |

When there is a difference between two adjacent flow rates listed in the same column in Table 5, there is a linear change in flow rate between the two listed rates. For example, the flow rate of GeCl$_4$ is listed as 0.5 lpm at 0 seconds and 0.475 lpm at 675 seconds. The flow rate of GeCl$_4$ changes linearly from 0.5 lpm to 0.475 lpm between the start of the run and 675 seconds. Similarly, the flow rate of Premix CH$_4$ changes linearly from 6 lpm to 14 lpm between 5401 seconds and 14,040 seconds.

The burner deposited a porous core preform by traversing back and forth over a 50.8 cm length of an alumina mandrel having a diameter that tapered from 5.88 mm to 4.95 mm. The mandrel was pulled from the porous preform to form an aperture therein. The tubular porous preform was inserted into a consolidation furnace where it was consolidated as described in U.S. Pat. Nos. 4,165,223 and 4,486,212. The maximum furnace temperature was set at 1472$_E$C. The downfeed rate of the porous preform through the hot zone was 3.5 mm/minute. A gas mixture of 20 lpm helium and 0.2 lpm chlorine flowed upwardly through the furnace muffle, while a gas mixture of 0.5 lpm helium and 0.1 lpm chlorine flowed into the preform aperture.

The consolidated core cane was mounted in a draw furnace where its tip was heated. A vacuum source was affixed to the opposite end. While an intermediate fiber having a diameter of 7 mm was drawn, the aperture closed. The intermediate fiber was severed into rods, one of which was employed as a mandrel upon which cladding soot was deposited to a diameter of approximately 80 mm. The resultant composite preform was consolidated to form a draw blank that was drawn into an optical fiber having an outside diameter of 125 µm and a core diameter of about 9 µm.

Figure 3:
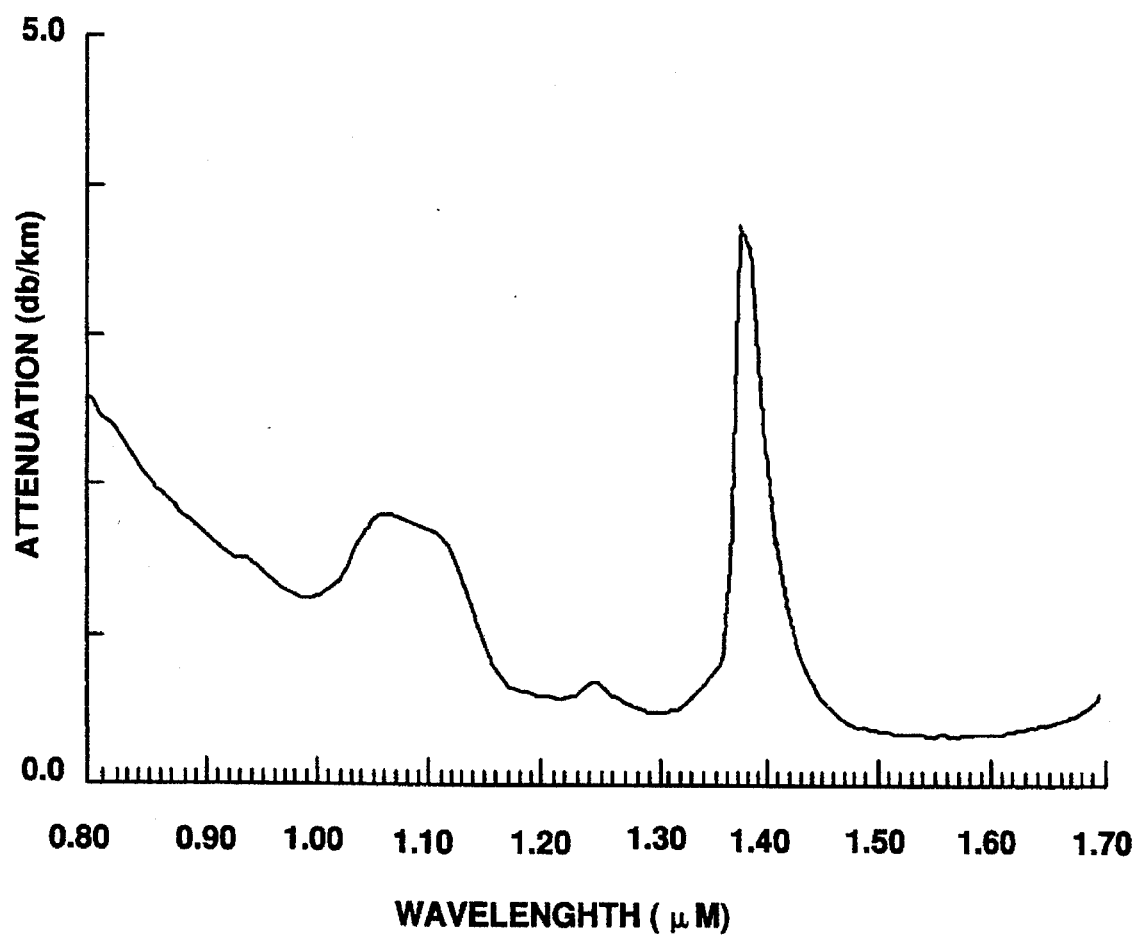
FIG. 3 is a spectral attenuation curve of an optical fiber drawn from a preform formed by a process in which $SnCl_4$ was added to the reactant stream mixture.

The spectral attenuation curve for the resultant fiber is shown in FIG. 3. The attenuation at 1570 nm is 0.280 dB/km. The strength of the resultant fiber was as good as that of a standard telecommunication fiber.

The entire core portion of the above-described draw blank contained GeO$_2$, and the cladding portion consisted of pure silica. The method of this invention could also be employed to make optical fibers having cores containing other dopants in addition to GeO$_2$. Moreover, to form an optical fiber such as a dispersion shifted fiber, the core could be made of more than one annular region, at least one of which contained GeO$_2$ and at least one of which contained no GeO$_2$. The cladding could be formed of silica doped with fluorine or boron or even with a dopant that increases the refractive index of silica, provided that the refractive index of the cladding does not exceed that of the core.

We claim:

1. A process for forming a GeO$_2$-doped SiO$_2$-based glass article comprising the steps of flowing to a reaction zone a reactant stream which includes precursors of SiO$_2$ and GeO$_2$, reacting said precursors to form a stream of glass particles, collecting said particles to form a porous preform, drying said porous preform, and sintering said porous preform to form a clear glass article, wherein said reactant stream includes a precursor of an oxide of a metal M which in its oxide state is not a glass former with SiO$_2$ and said metal oxide being one that decomposes to provide oxygen to reduce the reaction of GeO$_2$ with chlorine to thereby enhance the retention of GeO$_2$ in said article during the step of drying.

2. The process of claim 1 wherein the decomposition of the oxide of the metal M at least in part comprises the reaction of said oxide with chlorine.

3. The process of claim 1 wherein said metal M is selected from the group consisting of tin, antimony and bismuth and mixtures thereof.

4. The process of claim 1 wherein said metal M is tin.

5. The process of claim 1 wherein after the step of sintering, said clear glass article contains less than 0.01 weight percent MO$_2$.

6. The process of claim 1 wherein said reactant stream further includes precursors of metal oxides other than the precursor of GeO$_2$ that remain in and alter the refractive index of said clear glass article.

7. The process of claim 1 wherein said reactant stream further includes precursors of oxides of metals selected from the group consisting of P$_2$O$_5$ and B$_2$O$_3$.

8. A process for forming a GeO$_2$-doped SiO$_2$-based glass article comprising the steps of flowing to a reaction zone a reactant stream which includes precursors of SiO$_2$, GeO$_2$ and an oxide of a metal M, reacting said precursors to form a stream of glass particles containing SiO$_2$, GeO$_2$ and said oxide of the metal M, said oxide of the metal M not being a glass former, and said metal oxide being one that decomposes to provide oxygen to reduce the reaction of GeO$_2$ with chlorine in the subsequent drying step, collecting said particles to form a porous preform, drying said porous preform, and sintering said porous preform to form a clear glass article that is substantially free from said oxide of the metal M.

9. A process for forming a GeO$_2$-doped SiO$_2$-based glass article comprising the steps of flowing to a reaction zone a reactant stream which includes precursors of SiO$_2$, GeO$_2$ and SnO$_2$, reacting said precursors to form a stream of glass particles, collecting said particles to form a porous preform, drying said porous preform, and sintering said porous preform to form a clear glass article that is substantially free from SnO$_2$.

10. The process of claim 9 wherein after the step of sintering, said clear glass article contains less than 0.01 weight percent SnO$_2$.

11. The process of claim 9 wherein said reactant stream further includes precursors of metal oxides that alter the refractive index of said clear glass article.

12. The process of claim 9 wherein said reactant stream further includes precursors of oxides of metals selected from the group consisting of P$_2$O$_5$ and B$_2$O$_3$.

13. The process of claim 9 wherein the precursor of said $SnO_2$ is $SnCl_4$.

14. A process for forming an optical fiber comprising the steps of forming a draw blank comprising a core region surrounded by cladding glass, at least a portion of said core region consisting of $GeO_2$-doped $SiO_2$-based glass, and drawing said draw blank to form an optical fiber, the step of forming said at least a portion of said core region including flowing to a reaction zone a reactant stream which includes precursors of $SiO_2$ and $GeO_2$, reacting said precursors to form a stream of glass particles, collecting said particles to form a porous preform, drying said porous preform, and sintering said porous preform to form a clear glass article, wherein said reactant stream includes a precursor of an oxide of a metal M which in its oxide state is not a glass former with $SiO_2$ and said metal oxide being one that decomposes to provide oxygen to reduce the reaction of $GeO_2$ with chlorine to thereby enhance the retention of $GeO_2$ in said article during the step of drying.

15. A glass article produced by the process of claim 1.

16. An optical fiber produced by the method of claim 14.

* * * * *

UNITED STATES PATENT AND TRADEMARK OFFICE
CERTIFICATE OF CORRECTION

Page 1 of 2

PATENT NO. : 5,641,333
DATED : June 24, 1997
INVENTOR(S) : Gerald E. Burke; Carlton M. Truesdale It is certified that error appears in the above-indentified patent and that said Letters Patent is hereby corrected as shown below:

At column 4, Line 17, Table 1, Column 1, change $_EC$ to °C
At column 4, Line 17, Table 1, Column 2, change $_EC$ to °C
At column 4, Line 17, Table 1, Column 3, change $_EC$ to °C
At column 4, Line 51, Table 2, Column 1, change $_EC$ to °C
At column 4, Line 51, Table 2, Column 2, change $_EC$ to °C
At column 4, Line 51, Table 2, Column 3, change $_EC$ to °C
At column 5, Line 6, Change + to →
At column 5, Line 12, change + to →
At column 5, Line 19, change }~{ to ⇔
At column 5, Line 39, Table 3, Column 2, change $_EC$ to °C
At column 5, Line 39, Table 3, column 3, change $_EC$ to °C
At column 5, Line 41, Table 3, column 3, change 1.550 to 1550
At column 6, Line 5, Table 4, column 1, change $_EC$ to °C
At column 6, Line 5, Table 4, column 2, change $_EC$ to °C
At column 6, Line 5, Table 4, column 3, change $_EC$ to °C
At column 6, Line 21, change 1510$_E$C to 1510°C
At column 6, Line 53, change 43$_E$C to 43°C
At column 6, Line 54, change 55$_E$C to 55°C
At column 7, Line 4, Table 5, column 2, change $_EC$ to °C

UNITED STATES PATENT AND TRADEMARK OFFICE
CERTIFICATE OF CORRECTION

PATENT NO. : 5,641,333
DATED : June 24, 1997
INVENTOR(S) : Gerald E. Burke; Carlton M. Truesdale It is certified that error appears in the above-identified patent and that said Letters Patent is hereby corrected as shown below:

At column 7, Line 33, change $1472_EC$ to $1472°C$

Signed and Sealed this

Second Day of December, 1997

BRUCE LEHMAN

*Attest:*

*Attesting Officer*          Commissioner of Patents and Trademarks